(No Model.) 2 Sheets—Sheet 1.

R. L. WOODLING.
CHECK ROW CORN PLANTER.

No. 463,881. Patented Nov. 24, 1891.

WITNESSES
Geo. E. Frech.
Roland A. Fitzgerald

INVENTOR
R. L. Woodling
per Lehmann & Pattison
attys (No Model.) 2 Sheets—Sheet 2.

R. L. WOODLING.
CHECK ROW CORN PLANTER.

No. 463,881. Patented Nov. 24, 1891.

Witnesses
Geo. E. Frech
Roland A. Fitzgerald

Inventor
R. L. Woodling
per Lehmann & Pattison
attys.

UNITED STATES PATENT OFFICE.

REASON L. WOODLING, OF LOGANSPORT, INDIANA.

CHECK-ROW CORN-PLANTER.

SPECIFICATION forming part of Letters Patent No. 463,881, dated November 24, 1891.

Application filed May 23, 1891. Serial No. 393,888. (No model.)

*To all whom it may concern:*

Be it known that I, REASON L. WOODLING, of Logansport, in the county of Cass and State of Indiana, have invented certain new and useful Improvements in Check-Row Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in check-row corn-planters; and it consists in the combination and arrangement of parts which will be more fully described hereinafter.

The object of my invention is to provide a check-row corn-planter which will drop at equal distances apart and mark the ground where the corn has been dropped, and which is cheap and simple in construction, easily operated, and will not readily get out of repair.

Figure 1:
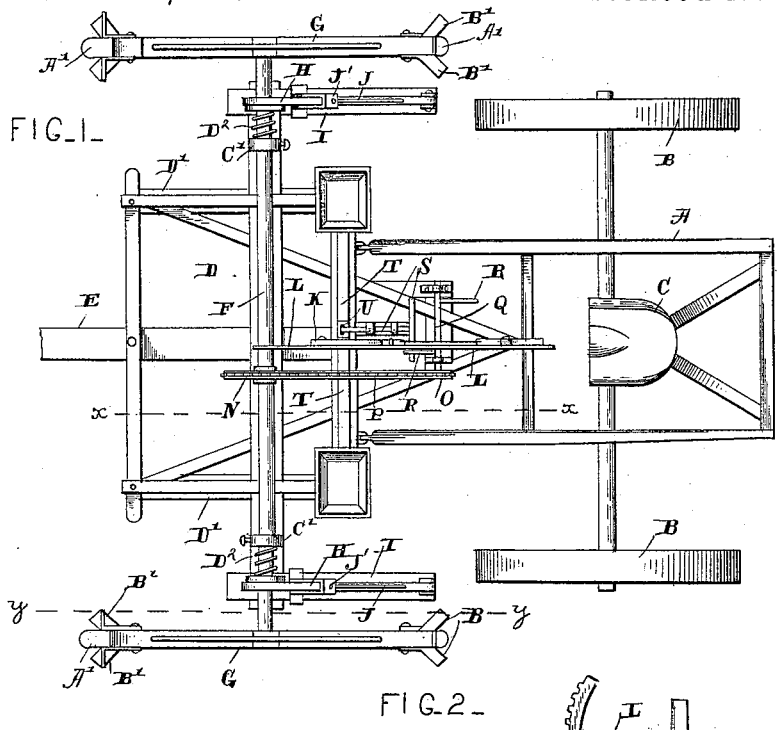
Figure 2:
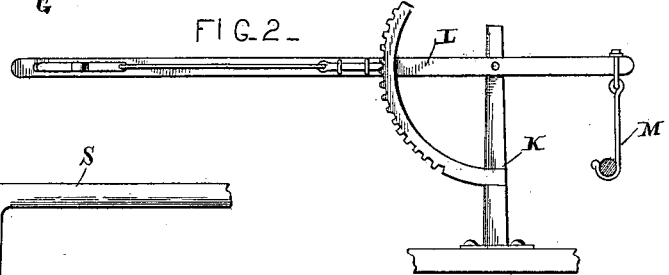
Figure 3:
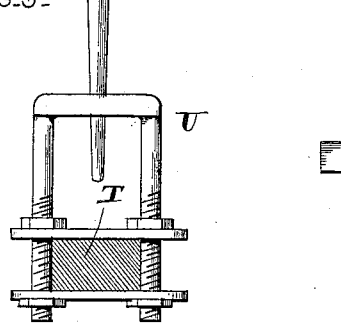
Figure 4:
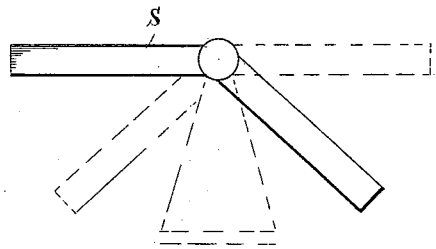
Figure 5:
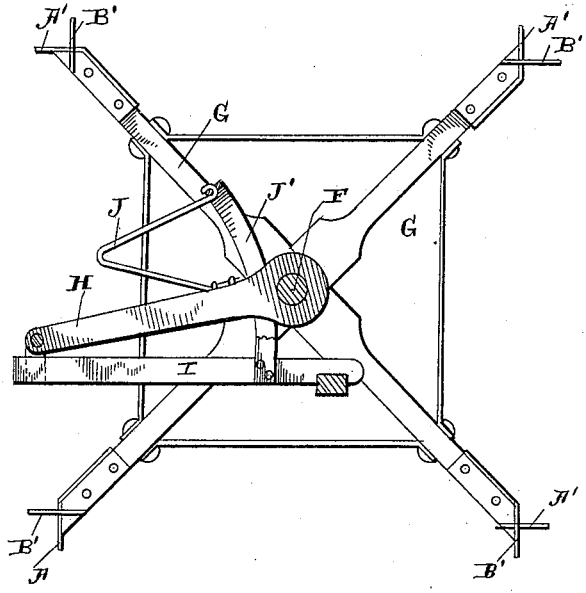
Figure 6:
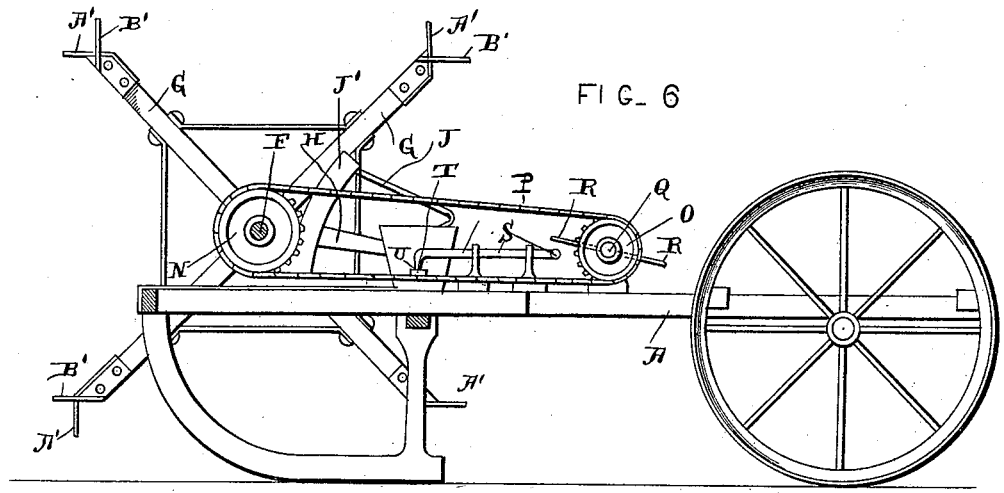

Figure 1 is a plan view of a planter which embodies my invention. Figs. 2, 3, and 4 are detail views of the same. Fig. 5 is a vertical section taken on dotted line $y\,y$ of Fig. 1. Fig. 6 is a vertical section taken on dotted line $x\,x$ of Fig. 1.

A represents the main frame of the planter, which has the axle extending through from side to side and is supported by the driving-wheels B. Upon this frame A is mounted the driver's seat C in the usual manner. The front end of this frame is fastened to the frame D, to which the tongue E is secured, and which is provided with furrow-openings D' in the usual manner. Extending across the top of this front frame D is the shaft F, which has the arms G secured to opposite ends. These arms, of which there are four at each end, are made of a suitable length and have spring or elastic plates A' secured to their ends for making a depression and taking a secure hold upon the ground, and the two bent plates B' projecting outwardly therefrom at right angles. As the arms are caused to revolve by the forward movement of the vehicle, they not only cause the shaft F to revolve for the purpose of operating the dropping mechanism, but to mark the ground opposite each hill of corn. Two of the arms strike the earth at the same time and upon opposite sides of the machine in the usual well-known manner.

The shaft F is journaled in the arms H, which are pivoted at their rear ends upon extensions or horizontal supports I from the frame D, and which arms pass through the guides J', placed upon the tops of the extensions for the purpose of guiding them. Between the tops of the arms H and the guides are placed the springs J, which serve to keep the arms H always pressed downward, and which cause the arms to promptly follow every inequality of the ground. In order to prevent the shaft F from having a lateral movement, there is secured to the shaft two collars C', which can be adjusted back and forth at the will of the operator, and upon the shaft, in between these collars and the arms, are placed washers and spiral springs $D^2$, which, while they allow the shaft a slight endwise movement, so as to follow the inequalities of the ground, instantly return the shaft to position as soon as it is left free to move.

For the purpose of raising the shaft F, so that the arms will not be brought into use while the machine is not used in dropping corn, there is mounted a standard K upon a suitable extension from the frame D, and upon this standard K is pivoted the lever L, which is provided with a bent rod or other suitable device M, which by catching under the shaft F enables it to be raised to such a height that the arms G will not be brought into use, except when so desired. Secured to this standard K is a segment or other suitable device, and mounted upon or secured to the lever is a spring-actuated dog or catch of the usual type, which engages with the segment and holds the lever in any desired position. The arms H and the guides in which they move while the lever is raised prevent the shaft F from tilting at either end and assist to hold it in a horizontal position. Upon this shaft F, near its center, is secured a sprocket-wheel N, having sixteen cogs, and from which extends a sprocket-chain P around the pinion O, which has but eight cogs, so that for every revolution of the shaft F the shaft Q, to which the pinion is fastened, is made to revolve twice. This shaft Q is journaled in suitable bearings provided for that purpose, and projecting from it are the two arms or levers R, which project in opposite directions, and which arms or levers as the shaft Q is made to revolve alternately strike the opposite ends of the shaft S. This shaft S is mounted in suitable journals and has its rear end turned horizontally at right angles, as shown, so as to project beyond the shaft upon each side, and which has its front end turned downward, so as to pass through the top of the clamp U, that is secured to the seed-slide T. The clamp U is bent into U shape, and both of its ends are screw-threaded, so as to receive the nuts which clamp the plates against opposite sides of the seed-slide. By this construction the length of the stroke of the seed-slide T can be regulated at will, for the higher the clamp is raised above the slide by the nuts the longer the stroke will be, and the lower the top of the clamp is depressed the shorter will be the stroke. The rocking of the shaft S causes the slide T to be moved back and forth with great regularity and the seed to be dropped at regular intervals apart. While the shaft F is raised by means of the lever L, the seed-slide is not operated.

Having thus described my invention, I claim—

1. In a planter, the main frame, supports extending transverse the shaft, arms pivoted to the outer ends of the supports, a driving-shaft journaled in the inner ends of the arms, and upwardly-extending vertically-slotted guides, through which the said pivoted arms pass, all combined substantially as specified.

2. The shaft provided with arms G at its opposite ends, and the toothed wheel secured to the shaft, combined with the sprocket-chain, the pinion, the shaft Q, to which the pinion is secured and which is provided with the arms R, the rocking shaft S, and a means for connecting the shaft with the seed-slide, so as to cause the slide to reciprocate, all combined substantially as shown and described.

3. In a planter, a shaft Q, an operating mechanism therefor, arms R, secured to the said shaft, a rocking shaft S, having its front end turned downward and its rear end provided with lateral arms in the path traveled by the arms R, and a seed-slide, combined with a clamp U, secured to the seed-slide, having an opening for the downwardly-turned end of the rocking shaft and vertically adjustable upon the seed-slide in relation to the downwardly-turned end of the rocking shaft, whereby the stroke of the seed-slide is regulated, substantially as shown and described.

In testimony whereof I affix my signature in presence of two witnesses.

REASON L. WOODLING.

Witnesses:
A. D. FAUSLER,
SILAS MORGAN.